(12) United States Patent
Henry et al.

(10) Patent No.: US 10,394,562 B2
(45) Date of Patent: *Aug. 27, 2019

(54) MICROPROCESSOR THAT FUSES IF-THEN INSTRUCTIONS

(71) Applicant: VIA TECHNOLOGIES, INC., New Taipei (TW)

(72) Inventors: G. Glenn Henry, Austin, TX (US); Terry Parks, Austin, TX (US)

(73) Assignee: VIA TECHNOLOGIES, INC., New Taipei (TW)

(*) Notice: Subject to any disclaimer, the term of this patent is extended or adjusted under 35 U.S.C. 154(b) by 213 days.

This patent is subject to a terminal disclaimer.

(21) Appl. No.: 15/728,551

(22) Filed: Oct. 10, 2017

(65) Prior Publication Data

US 2018/0032341 A1  Feb. 1, 2018

Related U.S. Application Data (63) Continuation of application No. 14/066,520, filed on Oct. 29, 2013, now Pat. No. 9,792,121.

(Continued)

(51) Int. Cl.
*G06F 9/30* (2018.01)
*G06F 9/38* (2018.01)

(52) U.S. Cl.
CPC ........ *G06F 9/30145* (2013.01); *G06F 9/3005* (2013.01); *G06F 9/3017* (2013.01);
(Continued)

(58) Field of Classification Search
None
See application file for complete search history.

(56) References Cited

U.S. PATENT DOCUMENTS 5,524,222 A   6/1996  Hervin
6,157,996 A  12/2000  Christie et al.
(Continued)

FOREIGN PATENT DOCUMENTS

CA   2356805 A1   3/2003

OTHER PUBLICATIONS

"ARM Architecture Reference Manual ARMv7-A and ARMv7-R Edition." Apr. 29, 2008. XP002730315. Retrieved from the Internet: http://www.club.cc.cmu.edu/-mjrosenb/ARM_v7_ArchitectureReferenceManua.pdf Retrieved on Sep. 23, 2014. pp. 1-19.

(Continued)

*Primary Examiner* — William B Partridge
(74) *Attorney, Agent, or Firm* — McClure, Qualey & Rodack, LLP (57) ABSTRACT

A microprocessor performs an If-Then (IT) instruction and an associated IT block by extracting condition information from the IT instruction and for each instruction of the IT block: determining a respective condition for the instruction using the extract condition information, translating the instruction into a microinstruction, and conditionally executing the microinstruction based on the respective condition. For a first instruction, the translating comprises fusing the IT instruction with the first IT block instruction. A hardware instruction translation unit performs the extracting, determining and translating. Execution units conditionally execute the microinstructions. The hardware instruction translation unit and execution units are distinct hardware elements and are coupled together. The hardware translation unit performs the extracting, fusing and for each instruction of the IT block the determining and translating without writing intermediate results to a system memory, without (Continued)

execution of other architectural instructions by the microprocessor, and/or in six clock cycles or less.

20 Claims, 5 Drawing Sheets

Related U.S. Application Data

(60) Provisional application No. 61/825,699, filed on May 21, 2013.

(52) U.S. Cl.
CPC ...... *G06F 9/30058* (2013.01); *G06F 9/30072* (2013.01); *G06F 9/30174* (2013.01); *G06F 9/3836* (2013.01); *G06F 9/3859* (2013.01)

(56) References Cited

U.S. PATENT DOCUMENTS

| | | | |
|---|---|---|---|
| 6,199,155 | B1 | 3/2001 | Kishida et al. |
| 6,230,259 | B1 | 5/2001 | Christie et al. |
| 6,456,891 | B1 | 9/2002 | Kranich et al. |
| 7,155,598 | B2 | 12/2006 | Henry et al. |
| 7,185,180 | B2 | 2/2007 | Henry et al. |
| 7,509,480 | B2 | 3/2009 | Jensen et al. |
| 2003/0188140 | A1 | 10/2003 | Henry et al. |
| 2004/0250051 | A1 | 12/2004 | Seal et al. |
| 2009/0259708 | A1 | 10/2009 | Elmer et al. |
| 2010/0115248 | A1 | 5/2010 | Ouziel et al. |
| 2010/0262813 | A1 | 10/2010 | Brown et al. |
| 2014/0304493 | A1 | 10/2014 | Zhong et al. |

OTHER PUBLICATIONS

De Gelas, Jonah. "Intel Core Versus AMD's K8 Architecture." ANandTech. Downloaded on Apr. 30, 2013 from http.//www.anandtech.com/show/1998/3 pp. 1-6.

MICROPROCESSOR THAT FUSES IF-THEN INSTRUCTIONS

CROSS REFERENCE TO RELATED APPLICATION(S)

This application is a continuation of U.S. patent application Ser. No. 14/066,520, filed Oct. 29, 2013, now U.S. Pat. No. 9,792,121, which claims priority based on U.S. Provisional Application, Ser. No. 61/825,699, filed May 21, 2013, each of Which is hereby incorporated by reference in its entirety.

BACKGROUND

Conditional instruction execution is an important aspect of processor instruction sets. For example, conditional branch instructions are almost ubiquitous in instruction sets and are frequently used in programs. Instruction sets may also include conditional execution of other types of instructions besides branch instructions.

There is a constant desire to increase the performance of processors. Processors whose microarchitecture enables them to execute instructions out of program order ("out-of-order execution") generally enjoy a significant performance improvement over processors with an in-order execution microarchitecture. Therefore, what is needed is a way to improve performance of out-of-order execution processors that include conditional instructions in their instruction sets.

BRIEF SUMMARY

In one aspect the present invention provides a method for performing, by a microprocessor, an If-Then (IT) instruction and an associated IT block. The method includes extracting condition information from the IT instruction. The method also includes for each instruction of the IT block: determining a respective condition for the IT block instruction using the condition information extracted from the IT instruction, translating the IT block instruction into a microinstruction, wherein the microinstruction includes the respective condition, and conditionally executing the microinstruction based on the respective condition. For a first instruction of the IT block, the translating the first IT block instruction into a microinstruction comprises fusing the IT instruction with the first IT block instruction. The extracting, the determining and the translating are performed by a hardware instruction translation unit of the microprocessor. Conditionally executing the microinstructions is performed by execution units of the microprocessor. The hardware instruction translation unit and the execution units are distinct hardware elements of the microprocessor and the execution units are coupled to the hardware instruction translation unit. The hardware translation unit performs the extracting, the fusing and for each instruction of the IT block the determining and the translating without writing intermediate results to a system memory.

In another aspect, the present invention provides a method for performing, by a microprocessor, an If-Then (IT) instruction and an associated IT block. The method includes extracting condition information from the IT instruction. The method also includes for each instruction of the IT block: determining a respective condition for the IT block instruction using the condition information extracted from the IT instruction, translating the IT block instruction into a microinstruction, wherein the microinstruction includes the respective condition, and conditionally executing the microinstruction based on the respective condition. For a first instruction of the IT block, the translating the first IT block instruction into a microinstruction comprises fusing the IT instruction with the first IT block instruction. The extracting, the determining and the translating are performed by a hardware instruction translation unit of the microprocessor. Conditionally executing the microinstructions is performed by execution units of the microprocessor. The hardware instruction translation unit and the execution units are distinct hardware elements of the microprocessor and the execution units are coupled to the hardware instruction translation unit. The hardware translation unit performs the extracting, the fusing, and for each instruction of the IT block the determining and the translating without execution of other architectural instructions by the microprocessor.

In yet another aspect, the present invention provides a method for performing, by a microprocessor, an If-Then (IT) instruction and an associated IT block. The method includes extracting condition information from the IT instruction. The method also includes for each instruction of the IT block: determining a respective condition for the IT block instruction using the condition information extracted from the IT instruction, translating the IT block instruction into a microinstruction, wherein the microinstruction includes the respective condition, and conditionally executing the microinstruction based on the respective condition. For a first instruction of the IT block, the translating the first IT block instruction into a microinstruction comprises fusing the IT instruction with the first IT block instruction. The extracting, the determining and the translating are performed by a hardware instruction translation unit of the microprocessor. Conditionally executing the microinstructions is performed by execution units of the microprocessor. The hardware instruction translation unit and the execution units are distinct hardware elements of the microprocessor and the execution units are coupled to the hardware instruction translation unit. The hardware translation unit performs the extracting, the fusing, and for each instruction of the IT block the determining and the translating in six clock cycles or less.

DETAILED DESCRIPTION OF THE EMBODIMENTS

Glossary

An If-Then (IT) instruction is an instruction that makes conditional N immediately following instructions, which are referred to herein as the "IT block" or "IT block instructions," where N is greater than zero. The IT instruction includes condition information from which may be determined: (1) N, and (2) a condition for each of the instructions of the IT block. An example of an IT instruction is an Advanced RISC Machines (ARM) Architecture IT instruction.

An IT block is N instructions that follow and are made conditional by an immediately preceding instruction, referred to herein as an "IT instruction," wherein N is greater than zero and is determinable from the IT instruction. The respective condition for each of the N instructions in the IT block may be determined from condition information in the IT instruction. An example of an IT block is an ARM Architecture IT block.

Fusing a first instruction with a second instruction means collectively translating the first and second instructions into C microinstructions where C is one less than the sum of A and B, where A is the number of microinstructions into which the first instruction is normally translated when not fused with another instruction and B is the number of microinstructions into which the second instruction is normally translated when not fused with another instruction. In many cases, A, B, and C are all one (1), i.e., fusing a first instruction with a second instruction means translating the first and second instructions into a single microinstruction.

An instruction translation unit is hardware in a processor that translates instructions from a first instruction set to instructions of a second instruction set. The first instruction set is externally visible to programmers writing programs to execute on the microprocessor. That is, the first instruction set is architectural: it conforms to an instruction set architecture (ISA). The instructions of the first instruction set are referred to herein as instructions, macroinstructions, program instructions, architectural instructions, or ISA instructions. The instructions of the second instruction set are executable by the execution units of the microprocessor. The instructions of the second instruction set are referred to herein as microinstructions. The results of the execution of the one or more microinstructions are the results defined by the program instruction. Thus, the collective execution of the one or more microinstructions by the execution units "implements" the program instruction; that is, the collective execution by the execution units of the implementing microinstructions generated by the instruction translation unit performs the operation specified by the program instruction on inputs specified by the program instruction to produce a result defined by the program instruction. The microinstructions into which fused program instructions are translated implement the fused program instructions.

An instruction set defines the mapping of a set of binary encoded values, which are instructions, to operations. Illustrative examples of the types of operations instructions may instruct a microprocessor to perform are: add the operand in register 1 to the operand in register 2 and write the result to register 3, subtract the immediate operand specified in the instruction from the operand in memory location 0x12345678 and write the result to register 5, shift the value in register 6 by the number of bits specified in register 7, branch to the instruction 36 bytes after this instruction if the zero flag is set, load the value from memory location 0xABCD0000 into register 8. Thus, the instruction set defines the binary encoded value each instruction must have to cause the microprocessor to perform the desired operation. It should be understood that the fact that the instruction set defines the mapping of binary values to microprocessor operations does not imply that a single binary value maps to a single microprocessor operation. More specifically, in some instruction sets, multiple binary values may map to the same microprocessor operation.

An instruction set architecture (ISA), or Architecture, in the context of a family of microprocessors, comprises: (1) an instruction set, (2) a set of resources (e.g., registers and modes for addressing memory) accessible by the instructions of the instruction set, and (3) a set of exceptions the microprocessor generates in response to processing the instructions of the instruction set (e.g., divide by zero, page fault, memory protection violation). Because a programmer, such as an assembler or compiler writer, who wants to generate a machine language program to run on a microprocessor family requires a definition of its ISA, the manufacturer of the microprocessor family typically defines the ISA in a programmer's manual. For example, at the time of its publication, the Intel 64 and IA-32 Architectures Software Developer's Manual, March 2009 (consisting of five volumes, namely Volume 1: Basic Architecture; Volume 2A: Instruction Set Reference, A-M; Volume 2B: Instruction Set Reference, N-Z; Volume 3A: System Programming Guide; and Volume 3B: System Programming Guide, Part 2), which is hereby incorporated by reference herein in its entirety for all purposes, defined the ISA of the Intel 64 and IA-32 processor architecture, which is commonly referred to as the x86 architecture and which is also referred to as x86, x86 ISA, x86 ISA family, x86 family or similar terms. For another example, at the time of its publication, the ARM Architecture Reference Manual, ARM v7-A and ARM v7-R edition Errata markup, 2010, which is hereby incorporated by reference herein in its entirety for all purposes, defined the ISA of the ARM processor architecture, which is also referred to herein as ARM, ARM Architecture, ARM ISA, ARM ISA family, ARM family or similar terms. Other examples of well-known ISA families are IBM System/360/370/390 and z/Architecture, DEC VAX, Motorola 68k, MIPS, SPARC, PowerPC, and DEC Alpha. The ISA definition covers a family of processors because over the life of the ISA processor family the manufacturer may enhance the ISA of the original processor in the family by, for example, adding new instructions to the instruction set and/or new registers to the architectural register set. To clarify by example, as the x86 ISA evolved it introduced in the Intel Pentium III processor family a set of 128-bit XMM registers as part of the SSE extensions, and x86 ISA machine language programs have been developed to utilize the XMM registers to increase performance, although x86 ISA machine language programs exist that do not utilize the XMM registers of the SSE extensions. Furthermore, other manufacturers have designed and manufactured microprocessors that run x86 ISA machine language programs. For example, Advanced Micro Devices (AMD) and VIA Technologies have added new features, such as the AMD 3DNOW! SIMD vector processing instructions and the VIA Padlock Security Engine random number generator and advanced cryptography engine features, each of which are utilized by some x86 ISA machine language programs but which are not implemented in current Intel microprocessors. To clarify by another example, the ARM ISA originally defined the ARM instruction set state, having 4-byte instructions. However, the ARM ISA evolved to add, for example, the Thumb instruction set state with 2-byte instructions to increase code density and the Jazelle instruction set state to accelerate Java bytecode programs, and ARM ISA machine language programs have been developed to utilize some or all of the other ARM ISA instruction set states, although ARM ISA machine language programs exist that do not utilize the other ARM ISA instruction set states.

The ARM Architecture specifies an ARM instruction set and a Thumb instruction set. The ARM instruction set is a set of 32-bit instructions. The Thumb instruction set was originally developed as a 16-bit instruction set with a subset of the ARM instruction set functionality. A subsequent version of the ARM ISA introduced Thumb-2 technology, which makes it possible to extend the original Thumb instruction set with many 32-bit instructions. Most instructions in the ARM instruction set can be executed conditionally, as specified in the upper four bits of the 32-bit instruction word. However, these four bits are normally not available in the 16-bit Thumb instructions (exceptions are conditional branch instructions, for example).

To address this deficiency, the AI M Architecture includes an instruction called the If-Then (IT) instruction. As stated on page A8-104 of the ARM Architecture Reference Manual, "If Then makes up to four following instructions (the IT block) conditional. The conditions for the instructions in the IT block can be the same, or some of them can be the inverse of others." The Architecture Reference Manual, ARM v7-A and ARM v7-R edition Errata markup, 2010, is hereby incorporated by reference herein in its entirety for all purposes. The ARM IT instruction specifies a first condition (bits [7:4]) and a mask (bits [3:0]). The first condition may be one of fifteen possible conditions according to Table 1 below. (A condition value of '1111' is UNPREDICTABLE.)

TABLE 1

| cond. value | Mnemonic | meaning (integer) | meaning (floating point) | condition flags value |
|---|---|---|---|---|
| 0000 | EQ | Equal | Equal | Z == 1 |
| 0001 | NE | Not Equal | Not Equal, or unordered | Z == 0 |
| 0010 | CS | Carry set | Greater than, equal, or unordered | C == 1 |
| 0011 | CC | Carry clear | Less Than | C == 0 |
| 0100 | MI | Minus/negative | Less Than | N == 1 |
| 0101 | PL | Plus/positive or zero | Greater than, equal, or unordered | N == 0 |
| 0110 | VS | Overflow | Unordered | V == 1 |
| 0111 | VC | No overflow | Not unordered | V == 0 |
| 1000 | HI | Unsigned higher | Greater than, or unordered | C == 1 and Z == 0 |
| 1001 | LS | Unsigned lower or same | Less than or equal | C == 0 or Z == 1 |
| 1010 | GE | Signed greater than or equal | Greater than or equal | N == V |
| 1011 | LT | Signed less than | Less than, or unordered | N != V |
| 1100 | GT | Signed greater than | Greater than | Z == 0, N == V |
| 1101 | LE | Signed less than or equal | Less than, equal, or unordered | Z == 1 or N != V |
| 1110 | AL | Always (unconditional) | Always (unconditional) | Any |

The ARM Architecture specifies an Application Program Status Register (APSR). The APSR includes four condition flags: N (Negative), Z (Zero), C (Carry), and V (Overflow). Each row of the far right-hand column of Table 1 shows the value of the condition flags that will satisfy the condition specified in the other columns of the corresponding row. That is, a condition shown in a given row of Table 1 for a conditional instruction, such as an IT block instruction made conditional by an IT instruction, is either satisfied or not satisfied by the current value of the condition flags of the APSR at execution time of the conditional instruction.

The first condition bits of the IT instruction specify the condition of the first instruction in the IT block. The mask bits of the IT instruction encode the number of instructions in the IT block, i.e., the number of instructions following the IT instruction made conditional by the IT instruction. The mask bits also encode, for each instruction in the IT block, whether the instruction is a "Then" (T) or an "Else" (E). A "T" indicates the condition for the IT block instruction will be the first condition (i.e., the condition specified by bits [7:4] of the IT instruction); whereas, an "E" indicates the condition for the IT block instruction will be the inverse of the first condition. For example, if the first condition is EQ and an E is specified in the mask for a given IT block instruction, then the condition for the IT block instruction will be NE. Effectively, an "E" for an IT instruction toggles the lower bit of the first condition (except E cannot be specified for the AL condition).

The ARM Architecture specifies a Current Program Status Register (CPSR). According to the ARM Architecture, the APSR is an application level alias of the CPSR. The CPSR includes execution state bits for the Thumb IT instruction referred to as ITSTATE bits. There are eight ITSTATE bits. The upper three bits of the ITSTATE ([7:5]) specify the base condition for the IT block instructions, and the lower five bits ([4:0]) encode the size of the IT block (i.e., the number of instructions in the IT block) and the value of the least significant bit of the condition for each IT block instruction. In a conventional ARM processor, the ITSTATE bits are updated by execution of an IT instruction and IT block instructions as will now be described.

In a conventional ARM processor, execution of an IT instruction causes the ITSTATE bits of the CPSR to be loaded with the lower eight bits of the IT instruction (i.e., the first condition bits [7:4] and the mask bits [3:0]). For each instruction in the IT block, the instruction is conditionally executed based on the value of the APSR condition flags. That is, the processor performs the operations specified by the IT block instruction only if the condition flags in the APSR satisfy the condition specified in bits [7:4] of the ITSTATE. That is, the condition for each IT block instruction is specified in the current value of bits [7:4] of the ITSTATE at execution time of the IT block instruction. At execution time of the first IT block instruction, its condition is determined from bits [7:4] of the ITSTATE after execution of the IT instruction. If the first IT block instruction completes its execution normally, bits [4:0] of the ITSTATE are left-shifted one bit (which includes shifting a zero into the least significant bit). At execution time of the second IT block instruction, its condition is determined from bits [7:4] of the updated ITSTATE. If the second IT block instruction completes its execution normally, bits [4:0] of the ITSTATE are again left-shifted one bit. This process continues for each of the IT block instructions until the last IT block instruction has completed its execution normally, in which case the ITSTATE bits are all updated to zero. However, if along the way one of the IT block instructions takes an exception, the non-updated value of the ITSTATE bits of the CPSR (i.e., the value of the CPSR ITSTATE before execution of the IT block instruction causing the exception) is saved in the ARM Architecture Saved Processor Status Register (SPSR) associated with the exception mode for the exception handler.

As may be observed from the description above, because an IT block instruction does not include its condition within itself, a conventional ARM processor obtains the condition for the IT instruction from the ITSTATE bits of the CPSR. This may create difficulty in performing out-of-order execution of IT block instructions.

Advantageously, embodiments are described herein that fuse an IT instruction with an adjacent instruction so that the IT instruction, which may be prolific in programs, does not needlessly consume resources in the machine, such as reorder buffer entries, reservation station entries, register allocation table entries, instruction indirection register entries, execution unit allocation slots, instruction retire slots and so forth. This may help increase the instruction per clock (IPC) rate of code that includes IT instructions, such as the ARM ISA IT instruction. Advantageously, embodiments described herein are susceptible to out-of-order execution of IT block instructions.

Figure 1:
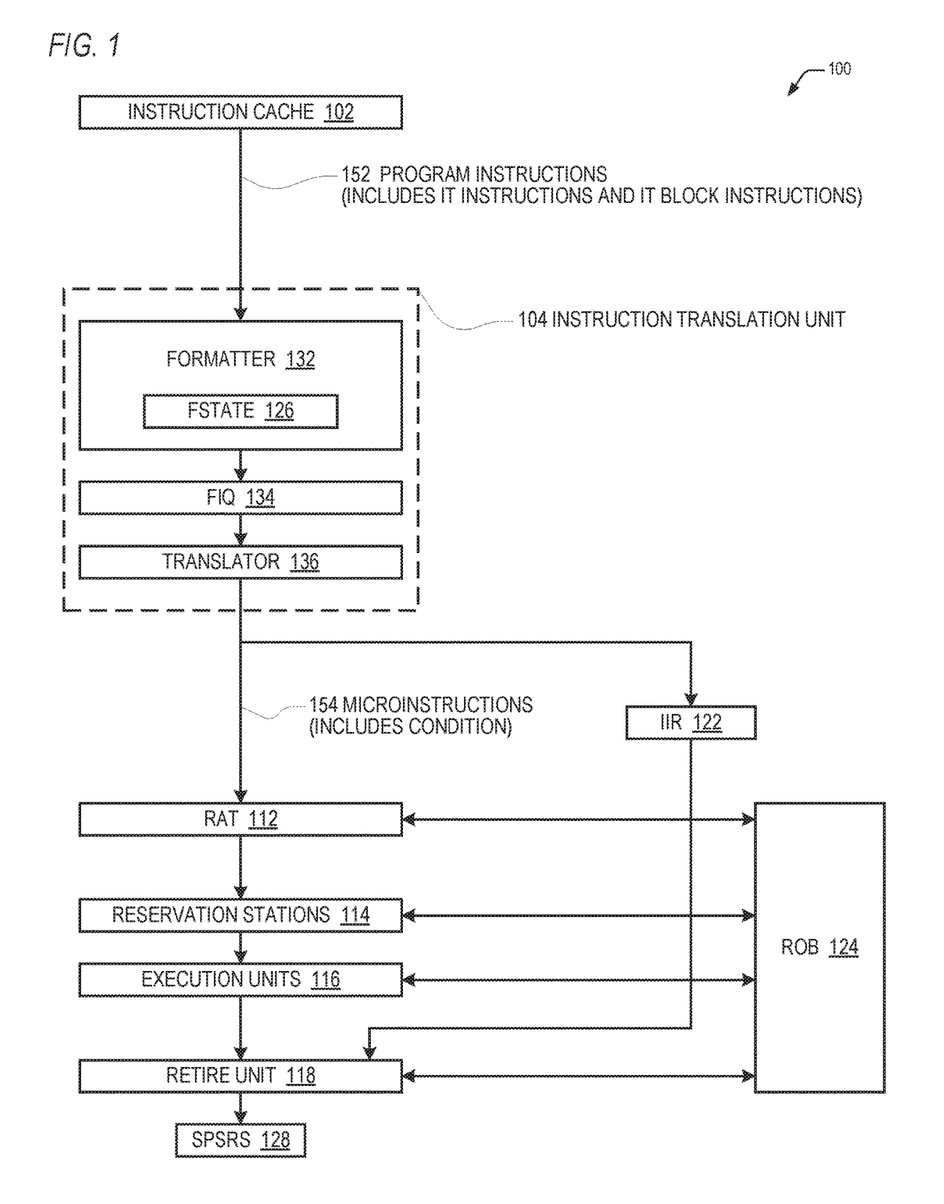
FIG. 1 is a block diagram illustrating a microprocessor.

Referring now to FIG. 1, a block diagram illustrating a microprocessor 100 is shown. The microprocessor 100 is an out-of-order execution microprocessor 100. That is, the microprocessor 100 issues independent instructions for execution out of program order when advantageous to do so. However, the microprocessor 100 retires instructions in program order. The microprocessor 100 includes a pipeline of functional units, including an instruction cache 102 coupled to an instruction translation unit 104 coupled to a register alias table (RAT) 112 coupled to reservation stations 114 coupled to execution units 116 coupled to a retire unit 118 coupled to SPSRs 128, preferably one per exception mode. The microprocessor 100 also includes an instruction indirection register (IIR) 122 coupled to the instruction translation unit 104 and a reorder buffer (ROB) 124 coupled to the execution units 116. The instruction translation unit 104 includes an instruction formatter 132 coupled to a formatted instruction queue (FIQ) 134 coupled to an instruction translator 136 coupled to the RAT 112. In one embodiment, a microinstruction queue is coupled between the instruction translator 136 and the RAT 112 to buffer microinstructions 154 generated by the instruction translator 136 and received by the RAT 112. The instruction formatter 132 includes storage referred to as the formatter state (FSTATE) 126.

The instruction cache 102 caches program instructions 152 fetched from system memory. In one embodiment, the instruction cache 102 provides sixteen program instruction 152 bytes per clock cycle to the instruction translation unit 104. The program instructions 152 are also referred to as ISA instructions 152, architectural instructions, macroinstructions 152, or simply instructions 152. In one embodiment, the program instructions 152 are ARM ISA instructions, which include Thumb instructions such as the Thumb IT instruction and Thumb instructions within the IT block that follows the IT instruction.

The instruction translation unit 104 translates the program instructions fetched from the instruction cache 102, including IT instructions and IT block instructions, into microinstructions 154. The microinstructions 154 are defined by a microinstruction set, which is the set of instructions the execution units 116 are configured to execute. The microinstruction set is distinct from the ISA to which the program instructions 152 belong. In one embodiment, the width of a microinstruction 154 is approximately 200 bits. Advantageously, as described herein, the instruction translation unit 104 fuses IT instructions with adjacent program instructions 152 to increase the efficiency of the microprocessor 100. The instruction translation unit 104 is described in more detail below.

The RAT 112 performs register renaming. The reservation stations 114 hold microinstructions 154 until they are ready to be issued to an execution unit 116 for execution, i.e., until all the source operands specified by the microinstruction 154 are available and an execution unit 116 is available to execute the microinstruction 154. The execution units 116 execute the microinstructions 154, including the microinstructions 154 translated from IT block instructions 152. The execution units 116 may include integer units, floating point units, SIMD units, load/store units, and/or branch units, for example. In one embodiment, the microprocessor 100) is capable of issuing a microinstruction 154 to each of the execution units 116 per clock cycle in a superscalar, out-of-order fashion.

In one embodiment, the RAT 112 renames the architectural registers of the microprocessor 100 specified by the program instructions 152 to physical registers that receive microinstruction 154 results. In one embodiment, the physical register name corresponds to the index of an entry within the ROB 124 allocated to the microinstruction 154. Preferably, the ROB 124 is organized as a circular queue. The RAT 112 receives the microinstructions 154 from the instruction translation unit 104 in program order and allocates a ROB entry 124 to each microinstruction 154 in a FIFO manner. Thus, the ROB 124 maintains an order of the microinstructions 154 that correspond to the program order of the program instructions 152 from which the corresponding microinstructions 154 were translated. This enables the retire unit 118 to retire microinstructions 154 and their corresponding program instructions 152 in program order. More specifically, once all the microinstructions 154 into which a program instruction 152 was translated have completed their execution by the execution units 116 and are the oldest microinstructions 154 in the microprocessor 100 (which may be determined from their location in the ROB 124 relative to a next-to-retire pointer), the retire unit 118 retires the microinstructions 154 and the program instruction 152, assuming none of the microinstructions 154 caused an exception. More specifically, the retire unit 118 writes the result of the microinstruction 154 to architectural state of the microprocessor 100, updates the architectural program counter, and frees up the ROB entries 124 associated with the microinstructions 154. Additionally, if a microinstruction 154 that is ready to retire caused an exception condition, the retire unit 118 updates the SPSR 128 of the associated exception mode.

The program instructions 152 may be variable length. For example, an ARM ISA program may include both 32-bit and 16-bit length instructions 152. The instruction formatter 132 decodes the stream of instruction bytes fetched from the instruction cache 102 and identifies the boundaries of the variable length program instructions 152. Preferably, the instruction formatter 132 places one program instruction 152 in each entry of the FIQ 134. The FIQ 134 entry is described in more detail with respect to FIG. 4. When the instruction formatter 132 encounters an IT instruction 152, it saves information in the FSTATE 126 that is needed by a state machine of the instruction formatter 132 to generate a respective ITSTATE for each of the IT block instructions 152, as described in more detail herein. Preferably, the FIQ 134 entry is configured to hold the corresponding ITSTATE received from the instruction formatter 132. The FSTATE 126 is described in more detail with respect to FIG. 3. In one embodiment, the instruction formatter 132 is capable of formatting up to three program instructions 152 and providing them to the FIQ 134 per clock cycle, along with the corresponding ITSTATE.

The FIQ 134 provides the formatted program instructions and their associated ITSTATE to the instruction translator 136, which translates them into microinstructions 154 and which also provides along with each microinstruction 154 the ITSTATE that was generated by the instruction formatter 132 for the program instruction 152 from which the microinstruction 154 was translated. In one embodiment, the FIQ 134 is configured to provide up to three formatted instructions to the instruction translator 136 per clock cycle for translation. The RAT 112 retrieves microinstructions 154 from the XIQ 138 in program order when ROB entries 124 are available for allocation to them. In one embodiment, the instruction formatter 132 indicates an IT instruction is a no-op instruction, and the instruction translator 136 is configured to fuse no-op instructions with an adjacent instruction.

Figure 2:
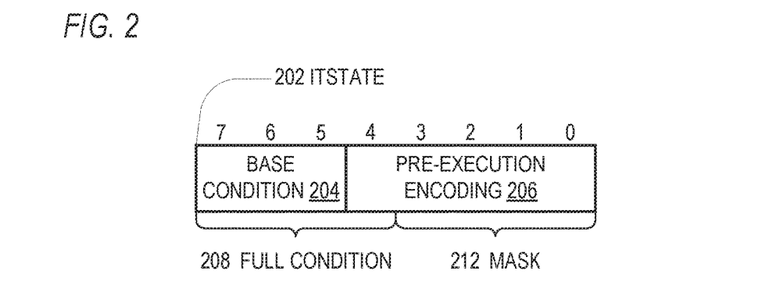
FIG. 2 is a block diagram illustrating the ITSTATE generated by the instruction formatter of FIG. 1 for each IT block instruction according to one embodiment.

Referring now to FIG. 2, a block diagram illustrating the ITSTATE 202 generated by the instruction formatter 132 of FIG. 1 for each IT block instruction according to one embodiment is shown. In one embodiment, the ITSTATE 202 generated by the instruction formatter 132 for each IT block instruction is eight bits. The instruction formatter 132 generates a "pre-execution" value of the bits of the ITSTATE 202 for an IT block instruction to simulate the operation of the ITSTATE bits of the CPSR as specified by the ARM Architecture. Conceptually, the ITSTATE 202 value is what the ITSTATE bits of the CPSR of a conventional ARM processor would be just prior to the execution of the IT block instruction. As shown in FIG. 1, bits [7:5] of the ITSTATE 202 hold the base condition 204, and bits [4:0] hold "pre-execution" bits 206 for the IT block instruction. The pre-execution bits 206 encode the least significant bit of the condition for the IT block instruction and the pre-execution IT block size. The pre-execution IT block size is the number of IT block instructions including the instant IT block instruction and excluding any instructions preceding it in the IT block. Stated alternatively, the value of the ITSTATE 202 for a given IT block instruction is bits [7:0] of the associated IT instruction 152 with bits [4:0] left-shifted by N−1 bits, where N indicates the instruction's position in the IT block, i.e., for the first instruction N is 1, for the second instruction N is 2, for the third instruction N is 3, and for the fourth instruction N is 4. For example, assume the value of the lower eight bits of the IT instruction is binary 00100101. This value specifies a first condition of CS (Carry Set=binary 0010) and a mask of 0101, which specifies the size of the IT block is four instructions and specifies a "T" for the second instruction of the IT block, an "E" for the third instruction, and a "T" for the fourth instruction. In such an example, the ITSTATE 202 generated by the instruction formatter 132 for the first IT block instruction is 00100101, for the second IT block instruction is 00101010, for the third IT block instruction is 00110100, and for the fourth IT block instruction is 00101000. In this manner, the full condition 208 of the IT block instruction is held in bits [7:4] of the ITSTATE 202, namely CS (binary 0010) for the first, second and fourth IT block instructions, and CC (Carry Clear=binary 0011) for the third IT block instruction. Bits [3:0] of the ITSTATE 202 are referred to as the mask bits 212. Preferably, for any non-IT block instruction, the instruction formatter 132 generates an ITSTATE 202 value of binary 00000000. The ITSTATE 202 facilitates microinstruction 154 execution and exception handling, which is described in more detail below. Briefly, the fill condition 208 of the ITSTATE 202 becomes the condition for each microinstruction 154 into which an IT block instruction is translated, and the full ITSTATE 202 becomes the ITSTATE of the SPSR 128 for provision to an exception handler.

From one perspective, the instruction translation unit 104 effectively translates an IT instruction 152 into zero microinstructions 154 by fusing it with an adjacent program instruction 152. Stated alternatively, the microinstructions into which the IT instruction 152 and IT block instructions 152 are translated are absent a microinstruction that corresponds to the IT instruction. That is, the instruction translation unit 104 translates the IT instruction 152 and its adjacent program instruction 152 into C microinstructions where C is one less than the sum of A and B, where A is the number of microinstructions 154 into which the adjacent program instruction 152 is normally translated when not fused with another instruction and B is the number of microinstructions 154 into which the IT instruction 152 is normally translated when not fused with another instruction, which is one, namely a no-op microinstruction 154. In many cases, A, B, and C are all one (1), i.e., fusing an IT instruction 152 with an adjacent program instruction 152 means translating the two instructions into a single microinstruction 154. The fusing is possible because the instruction translation unit 104 generates the appropriate ITSTATE for each microinstruction 154 translated from an IT block instruction 152. This eliminates the need for a microinstruction 154 to populate the CPSR ITSTATE bits as would be performed in response to an IT instruction in a conventional ARM processor from which the conditions for the IT block instructions 152 would be obtained. Thus, the functionality of the IT instruction 152 is distributed among the microinstructions 154 into which the IT block instructions 152 are translated, as described in more detail herein.

Figure 3:
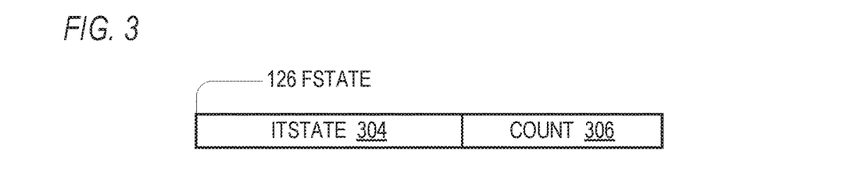
FIG. 3 is a block diagram illustrating the FSTATE of FIG. 1 according to one embodiment.

Referring now to FIG. 3, a block diagram illustrating the FSTATE 126 of FIG. 1 according to one embodiment is shown. The FSTATE 126 includes an ITSTATE field 304 and a count 306. When the instruction formatter 132 encounters an IT instruction 152, it decodes the IT instruction 152 to determine the number of instructions in the IT block and populates the count 306 with the number of instructions in the IT block and populates the ITSTATE 304 with bits [7:0] of the IT instruction 152, both of which may be modified based on the number of IT block instructions 152 processed during the same clock cycle as the IT instruction 152, as described in more detail below. The instruction formatter 132 uses the ITSTATE 304 and count 306 values in subsequent clock cycles to generate the ITSTATE 202 for IT block instructions not formatted in the clock cycle in which the IT instruction was formatted. In an ARM Architecture embodiment, the number of instructions in the IT block is determined from the mask bits (bits [3:0]) of the IT instruction 152, as discussed above. Specifically, if bit 0 is a one, the number of instructions is four; if bit 0 is a zero and bit 1 is a one, the number is three; if bits 0 and 1 are zero and bit 2 is a one, the number is two; and if bits 0, 1 and 2 are zero and bit 3 is a one, the number is one. In one embodiment, the instruction formatter 132 is capable of formatting multiple instructions 152 per clock cycle for storage into the FIQ 134. As the instruction formatter 132 formats IT block instructions 152, it decrements the count 306 by the number formatted in the given clock cycle and updates the ITSTATE 304 accordingly. More specifically, the instruction formatter 132 shifts left the lower five bits of the ITSTATE 304 by the number of IT block instructions formatted in the given clock cycle. If the instruction formatter 132 formats the IT instruction 152 and one or more of the IT block instructions in a given clock cycle, the initial value of the count 306 and ITSTATE 304 will reflect the number of IT block instructions formatted in the clock cycle. For example, if the IT block includes four instructions and the instruction formatter 132 formats the IT instruction 152 and the first two IT block instructions in the first clock cycle, then the count 306 will be written with a value of two and the ITSTATE 304 will have the value of the lower eight bits of the IT instruction but having the lower five bits left-shifted by two bits. Embodiments are contemplated in which the instruction formatter 132 formats three or more instructions per clock cycle and therefore may encounter two IT instruction 152. In such embodiments, the instruction formatter 132 includes storage for two FSTATE 126.

Figure 4:
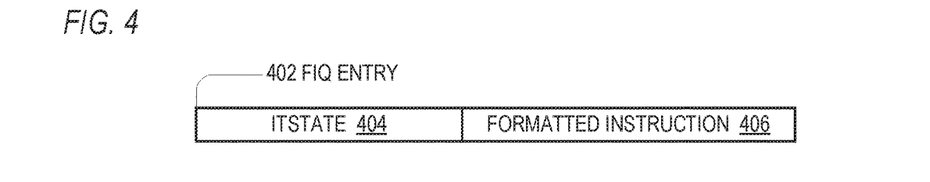
FIG. 4 is a block diagram illustrating an entry in the FIQ of FIG. 1 according to one embodiment.

Referring now to FIG. 4, a block diagram illustrating an entry 402 in the FIQ 134 of FIG. 1 according to one embodiment is shown. The FIQ entry 402 includes a field 406 for receiving from the instruction formatter 132 a formatted program instruction, which may be an IT instruction 152, an IT block instruction or other program instruction 152. The FIQ entry 402 also includes an ITSTATE field 404 for receiving the ITSTATE 202 generated by the instruction formatter 132 for the formatted program instruction 406.

Figure 5:
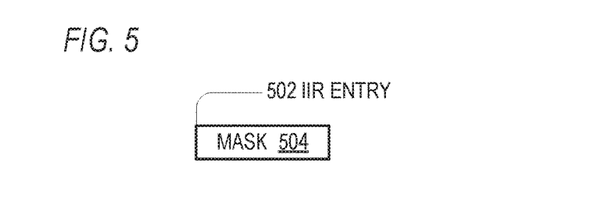
FIG. 5 is a block diagram of an entry in the IIR of FIG. 1.

Referring now to FIG. 5, a block diagram of an entry 502 in the IIR 122 of FIG. 1 is shown. An entry 502 in the IIR 122 is allocated for each microinstruction 154 generated by the instruction translation unit 104. Each IIR entry 502 holds some of the state of the microinstruction 154. As shown in FIG. 2, each IIR entry 502 includes a mask field 504, among other state (not shown) for the microinstruction 154. When the instruction translation unit 104 generates microinstructions 154 translated from IT block instructions, the mask bits 212 of the ITSTATE 202 that was generated by the instruction formatter 132 for the IT block instruction from which the microinstruction 154 was translated is stored into the mask field 504 of the IIR entry 502 allocated for the microinstruction 154. If the microinstruction 154 causes an exception, the microprocessor 100 reads the mask 504 value from the corresponding IIR entry 502 for populating the ITSTATE[3:0] bits of the SPSR 128 of the associated exception mode, which may be provided to an exception handler. In this manner, the ITSTATE of the CPSR may be conceptualized as virtual or distributed among the various microinstructions 154 rather than residing within a single architectural state. This advantageously facilitates out-of-order execution of microinstructions 154, including the microinstructions 154 translated from IT block instructions. Preferably, if the instruction translation unit 104 translates the IT block instruction 152 into multiple microinstructions 154, each microinstruction 154 has its associated IIR entry 502 populated with the mask bits 212 of the ITSTATE 202 that was generated by the instruction formatter 132 for the IT block instruction from which the microinstruction 154 was translated. In an alternate embodiment, the mask 212 flows down the pipeline as part of the microinstruction 154 all the way to the retire unit 118, rather than being stored in the IIR 122. In an alternate embodiment, the mask 212 is stored in the ROB entry 602 (see FIG. 6) associated with the microinstruction 154, rather than being stored in the IIR 122, and is provided from the ROB entry 602 to the retire unit 118.

Figure 6:
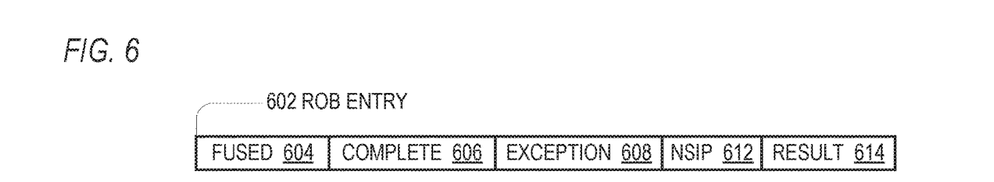
FIG. 6 is a block diagram illustrating an entry in the ROB of FIG. 1 according to one embodiment.

Referring now to FIG. 6, a block diagram illustrating an entry 602 in the ROB 124 of FIG. 1 according to one embodiment is shown. The RAT 112 allocates a ROB entry 602 for each microinstruction 154 in program order. The ROB entry 602 includes a fused flag 604, a complete flag 606, an exception flag 608, a next sequential instruction pointer (NSIP) field 612 and a result field 614 associated with the microinstruction 154 for which the entry 602 is allocated. The result field 614 receives the result of the microinstruction 154 from the execution unit 116 that executes the microinstruction 154. The fused flag 604 is set to a true value if the instruction translator 136 fused the program instruction 152 from which the microinstruction 154 was translated with an adjacent program instruction 152; otherwise, the fused flag 604 is set to a false value. Advantageously, if the instruction translation unit 104 fuses an IT instruction 152 with an adjacent program instruction 152, the microprocessor 100 sets the fused flags 604 of the microinstructions 154 into which the IT instruction 152 and its adjacent program instruction 152 are translated. The NSIP 612 is normally populated with the memory address of the program instruction 152 immediately following the program instruction 152 from which the microinstruction 154 was translated. However, in the case where two program instructions 152 are fused, the NSIP 612 is populated with the memory address of the program instruction 152 immediately following the second of the two fused program instructions 152. The complete flag 606 is initially false on allocation of the ROB entry 602, and the execution unit 116 sets the complete 606 flag to true once it has completed the microinstruction 154, which includes populating the result 614 and exception flag 608 of the entry 602.

The exception flag 608 is initially false on allocation of the ROB entry 602, and the execution unit 116 sets the exception flag 608 to true if the microinstruction 154 creates an exception condition. If a microinstruction 154 indicates an exception and its fused flag 604 indicates that its corresponding program instruction 152 was fused, such as a fused IT instruction 152, the retire unit 118 instructs the instruction translation unit 104 to temporarily refrain from fusing program instructions 152. The retire unit 118 causes the microprocessor 100 to begin re-fetching and re-translating the program at the previously fused program instructions 152 that caused the exception, and this time the instruction translation unit 104 does not fuse adjacent program instructions 152. Thus, if an IT instruction 152 is fused with an adjacent program instruction 152 and either of them causes an exception, the IT instruction 152 and the adjacent program instruction 152 are re-translated but not fused by the instruction translation unit 104 in the re-translation. Preferably, when an IT instruction 152 is re-translated without fusing, the instruction translation unit 104 translates the IT instruction 152 into a no-op microinstruction 154 since there is no operation for the microinstruction 154 to perform because there is no single architectural ITSTATE bits of the CPSR to load and because the ITSTATE 202 has been generated by the instruction translation unit 104 for each microinstruction 154 into which the associated IT block instructions 152 were translated, as described herein. Examples of exception conditions may include, but are not limited to, breakpoints, undefined instructions, supervisor calls, software interrupts, memory system aborts, page faults, machine checks, memory protection faults, and various arithmetic exceptions, such as division by zero, overflow, and underflow.

Figure 7:
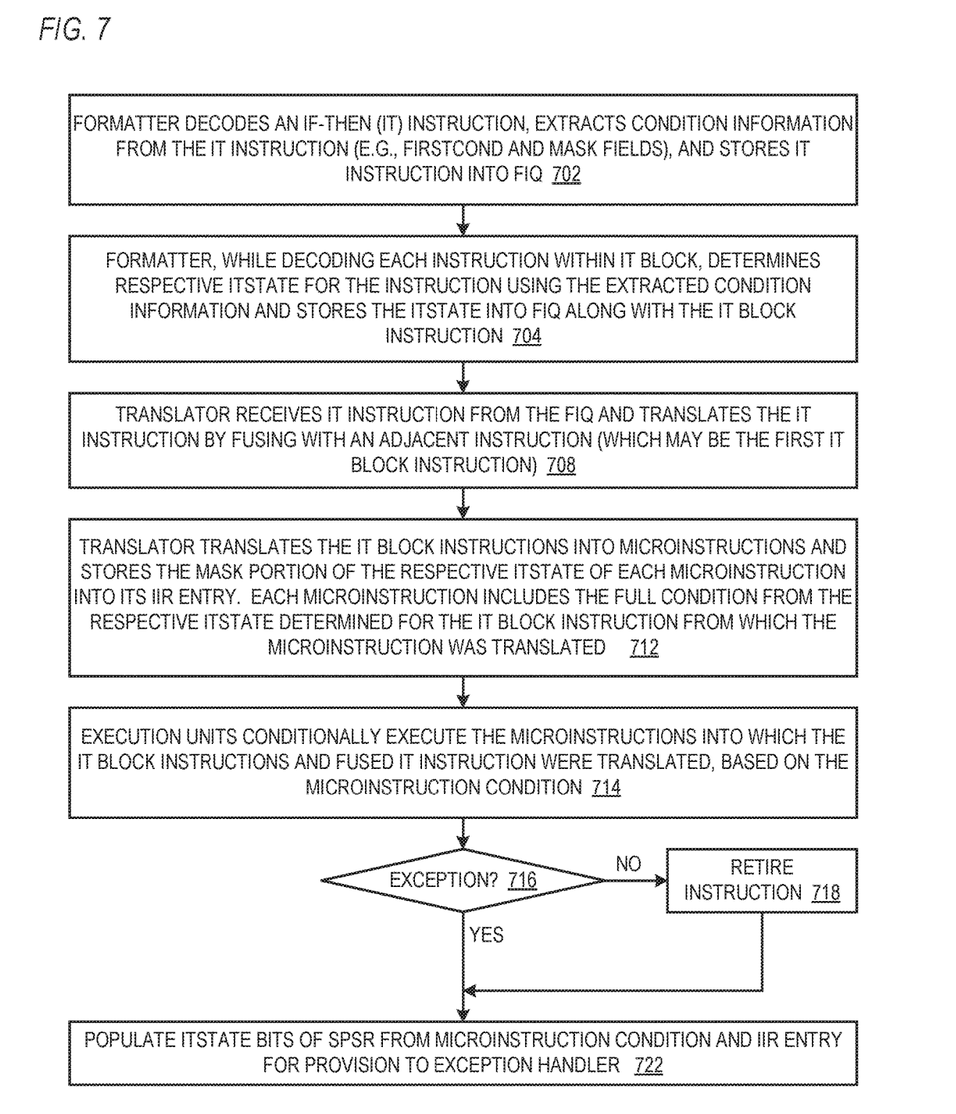
FIG. 7 is a flowchart illustrating operation of the microprocessor of FIG. 1 to perform an IT instruction and IT block.

Referring now to FIG. 7, a flowchart illustrating operation of the microprocessor 100 of FIG. 1 to perform an IT instruction 152 and IT block is shown. Flow begins at block 702.

At block 702, the instruction formatter 132 encounters and decodes an IT instruction 152 within the stream of program instruction 152 bytes received from the instruction cache 102. The instruction formatter 132 extracts the information from the IT instruction 152 needed to generate the ITSTATE 202 for the following IT block instructions 152. In an ARM Architecture embodiment, the extracted information is the first condition and mask fields (lower eight bits) of the IT instruction 152. The instruction formatter 132 also pushes the IT instruction 152 into the FIQ 134 along with an ITSTATE 202 of 00000000. In one embodiment, the instruction formatter 132 marks the IT instruction as a no-op instruction before writing it into the FIQ 134, and the instruction translator 136 is configured to fuse a no-op program instruction 152 with an adjacent program instruction 152. The instruction formatter 132 also updates the FSTATE 126 based on the extracted information. More specifically, the instruction formatter 132 populates the count 306 with the number of IT block instructions 152 remaining to be processed by the instruction formatter 132. For example, if the instruction formatter 132 processed all of the IT block instructions 152 during the same clock cycle it processed the IT instruction 152, then the instruction formatter 132 populates the count 306 with a value of zero. For another example, if the instruction formatter 132 processed none of the IT block instructions 152 during the same clock cycle it processed the IT instruction 152, then the instruction formatter 132 populates the count 306 with a value that is the size of the IT block. For another example, assume the size of the IT block is three and the instruction formatter 132 processes one of the IT block instructions 152 during the same cycle as it processes the IT instruction 152, then the instruction formatter 132 populates the count 306 with a value of two. Furthermore, the instruction formatter 132 populates bits [7:5] of the ITSTATE 304 with bits [7:5] of the IT instruction 152. Finally, the instruction formatter 132 populates bits [4:0] of the ITSTATE 304 with bits [4:0] of the IT instruction 152 left-shifted by the number of IT block instructions 152 processed during the same clock cycle as the IT instruction 152. Flow proceeds to block 704.

At block 704, the instruction formatter 132 decodes the IT block instructions 152. It should be understood that some or all of the IT block instructions 152 may be processed at block 704 in the same clock cycle as the processing of the IT instruction 152 at block 702. The instruction formatter 132 determines the ITSTATE 202 for each IT block instruction. If the IT block instruction is being processed in the same clock cycle as the IT instruction 152, the instruction formatter 132 generates the ITSTATE 202 with a value that is the lower eight bits of the IT instruction 152 and having the lower five bits shifted by N−1, where N is the position of the instruction in the IT block. If the IT block instruction is being processed in a subsequent clock cycle as the IT instruction 152, the instruction formatter 132 generates the ITSTATE 202 as the value of the FSTATE 126 ITSTATE 304 having the lower five bits shifted by M−1, where M is the position of the instruction within the group of instructions being processed that clock cycle by the instruction formatter 132. For example, assume: (1) the instruction formatter 132 is capable of formatting three instructions per clock cycle, (2) the value of the lower eight bits of the IT instruction 152 are 00001111 (i.e., the size of the IT block is four instructions, the first condition is EQ, and each of the other three instructions are "E"), and (3) one of the IT block instructions 152 is processed during the clock cycle the IT instruction 152 was processed. In that case, during the first clock cycle (i.e., the clock cycle in which the IT instruction 152 is processed), the instruction formatter 132: generates an ITSTATE 202 for the first IT block instruction with a value of 00001111, which is the lower eight bits of the IT instruction 152 having the lower five bits shifted by zero (N−1=1−1=0); populates the FSTATE 206 ITSTATE 304 with binary 00011110, which is the lower eight bits of the IT instruction 152 left-shifted by one, which is the number of instructions processed during the first clock cycle; and populates the count 306 with three, which is the number of IT block instructions 152 remaining to be processed. During the second clock cycle, the instruction formatter 132: generates an ITSTATE 202 value for each of the remaining three IT block instructions 152 as shown in Table 2 below; updates the count 306 to zero, which is the previous count 306 value (three) minus the number of instructions processed during the second clock cycle (three); and populates the ITSTATE 304 with 00010000, which is the previous ITSTATE 304 having the lower five bits left-shifted by three, which is the number of IT block instructions 152 processed during the second clock cycle. Flow proceeds to block 708.

TABLE 2

| N (instruction position within instruction group being processed this clock cycle) | ITSTATE 202 generated by instruction formatter | Explanation |
| --- | --- | --- |
| 1 | 00011110 | ITSTATE 304 (00011110) having the lower five bits left-shifted by zero (N − 1 = 0) |
| 2 | 00011100 | ITSTATE 304 (00011110) having the lower five bits left-shifted by one (N − 1 = 1) |
| 3 | 00011000 | ITSTATE 304 (00011110) having the lower five bits left-shifted by two (N − 1 = 2) |

At block 708, the instruction translator 136 receives the IT instruction 152 from the FIQ 134 and translates it into a microinstruction 154. Normally, when the instruction translator 136 translates the IT instruction 152, it fuses the IT instruction 152 with an adjacent program instruction 152, as described above. However, as described above, if the IT instruction 152 is being re-translated due to an exception or if fusing is disabled for some other reason, the instruction translator 136 translates the IT instruction 152 into a no-op microinstruction 154. Preferably, the instruction translator 136 fuses the IT instruction 152 with the adjacent program instruction 152 on either side of the IT instruction 152, depending upon the orientation of the IT instruction 152 within the line of formatted instructions provided by the FIQ 134 to the instruction translator 136. That is, the adjacent program instruction 152 may be either the program instruction 152 preceding the IT instruction 152 or the program instruction 152 following the IT instruction 152, i.e., the first program instruction 152 of the IT block. For example, assume the instruction translator 136 is capable of translating three formatted instructions per clock cycle. If the IT instruction 152 is the last of the three instructions received by the instruction translator 136 in a given clock cycle, then the instruction translator 136 will fuse the IT instruction 152 with the preceding instruction; whereas, if the IT instruction 152 is the first or second of the three instructions, then the instruction translator 136 will fuse the IT instruction 152 with the succeeding instruction, i.e., with the first instruction of the IT block. It should be understood that the fusing of the IT instruction 152 with the adjacent program instruction 152 at block 708 will occur at the same time as the translation of the first IT block instruction at block 712 in the case that the IT instruction 152 is fused with the first IT block instruction. Flow proceeds to block 712.

At block 712, the instruction translator 136 receives the formatted IT block instructions 406 and corresponding ITSTATE 404 from the FIQ 134 and translates the IT block instructions 406 into microinstructions 154. That is, the instruction translator 136 translates each IT block instruction 406 into one or more microinstructions 154 that implement the IT block instruction 406. Each of the microinstructions 154 includes a condition field that the instruction translator 136 populates with the full condition 208 (i.e., bits [7:4]) of the corresponding ITSTATE 404 received from the FIQ 134. The instruction translator 136 then outputs each of the microinstructions 154 for provision to the RAT 112. As mentioned above, in one embodiment a microinstruction queue is coupled between the instruction translator 136 and the RAT 112 to buffer microinstructions 154. Additionally, the instruction translator 136 also provides the mask bits 212 (i.e., bits [3:0]) of the corresponding ITSTATE 404 for loading into the mask field 504 of the IIR entry 502 allocated for the microinstruction 154. In an alternate embodiment, the mask 212 for each microinstruction 154 is simply piped down the microprocessor 100 pipeline to the retire unit 118 along with the microinstruction 154, rather than being stored in the IIR 122 and then provided to the retire unit 118 at retire time. In another alternate embodiment, the mask 212 is stored in the ROB entry 602 associated with the microinstruction 154, rather than being stored in the IIR 122, and is provided from the ROB entry 602 to the retire unit 118 at retire time. It should be understood that the translation of the IT block instructions 406 at block 712 may occur within the same clock cycle as the translation and fusing of the IT instruction at block 708. Flow proceeds to 714.

At block 714, the microinstructions 154 into which the IT instruction 152 and IT block instructions 152 were translated and fused are provided to the RAT 112, then to the reservation stations 114 and eventually to the execution units 116. The execution units 116 conditionally execute the microinstructions 154 by determining whether the condition flags of the APSR satisfy the condition of the microinstruction 154, which was generated from the full condition bits 208 of the ITSTATE 202. If the condition is satisfied, the execution unit 116 executes the microinstruction 154; otherwise, the execution unit 116 treats the microinstruction 154 as a no-op microinstruction 154. Flow proceeds to decision block 716.

At decision block 716, the retire unit 118 determines that a microinstruction 154 into which a program instruction 152 was translated has become the oldest microinstructions 154 in the ROB 124. In response, the retire unit 118 determines whether the microinstruction 154 caused an exception by examining the exception flag 608 of the ROB entry 602 allocated to the microinstruction 154. If so, flow proceeds to block 722; otherwise, flow proceeds to block 718.

At block 718, the retire unit 118 retires the microinstruction 154 and the program instruction 152 from which the microinstruction 154 was translated. Flow ends at block 718.

At block 722, the retire unit 118 populates the ITSTATE bits of the SPSR 128 associated with the exception mode with the condition bits of the microinstruction 154 and the mask bits 504 from the IIR entry 502 allocated for the microinstruction 154 for provision to an exception handler invoked to handle the exception. Flow ends at block 722.

Figure 8:
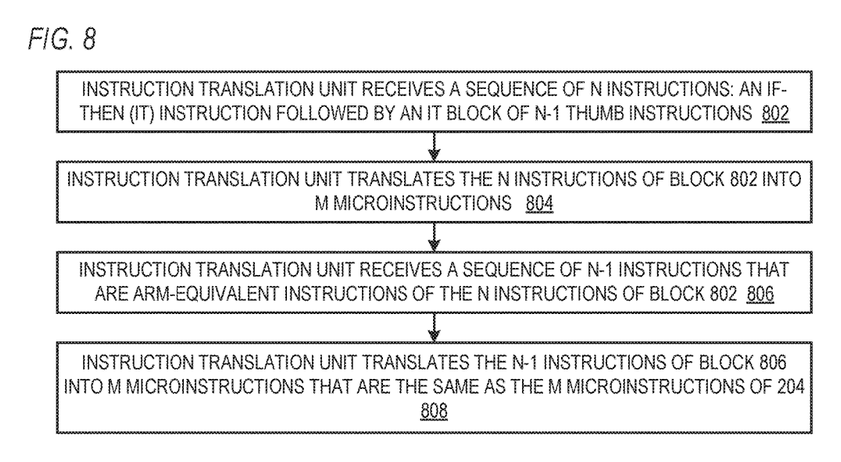
FIG. 8 is a block diagram illustrating a flowchart illustrating operation of the microprocessor of FIG. 1.

Referring now to FIG. 8, a block diagram illustrating a flowchart illustrating operation of the microprocessor 100) of FIG. 1 is shown. Flow proceeds at block 802.

At 802, the instruction translation unit 104 receives a sequence of N program instructions 152 from the instruction cache 102, wherein N is an integer greater than one. The sequence of N program instructions 152 is an IT instruction 152 followed by an IT block of N−1 unconditional instructions implicitly made conditional by the IT instruction 152. For example, the N−1 unconditional instructions may be 16-bit unconditional Thumb instructions. Flow proceeds to block 804.

At block 804, the instruction translation unit 104 translates the sequence of N program instructions 152 received at block 802 into a sequence of M microinstructions 154, wherein M is an integer greater than zero. Translating the sequence of N program instructions 152 includes fusing the IT instruction 152 with an adjacent program instruction 152. Flow proceeds to block 806.

At block 806, the instruction translation unit 104 receives a sequence of N−1 program instructions 152, which is different from the sequence of N program instructions 152 received at block 802, wherein N is the same integer as in block 802. The sequence of N−1 program instructions 152 of block 806 does not include an IT instruction 152, and the N−1 program instructions 152 in the sequence of block 806 correspond to the N−1 program instructions 152 in the IT block of the sequence of block 802. Each program instruction 152 of block 806 specifies the same operation as its corresponding program instruction 152 of block 802; however, the program instruction 152 of block 806 explicitly specifies the condition that is implicitly specified for the corresponding program instruction 152 in the IT instruction 152 of block 802. For example, the program instructions 152 of block 806 may be 32-bit conditional ARM instructions. Flow proceeds to block 808.

At block 808, the instruction translation unit 104 translates the sequence of N−1 program instructions 152 received at block 806 into a sequence of M microinstructions 154 that are the same as the M microinstructions 154 generated by the instruction translation unit 104 at block 804. Advantageously, the fusing of the IT instruction 152 at block 804 provides the benefit of generating one fewer microinstruction 154 than would otherwise be generated, which has the advantage of consuming fewer resources in the microprocessor 100, such as ROB 124 entries, reservation station 114 entries, RAT 112 entries, IIR 122 entries, execution unit 116 allocation slots, instruction retire unit 118 slots and so forth. Flow ends at block 808.

Figure 9:
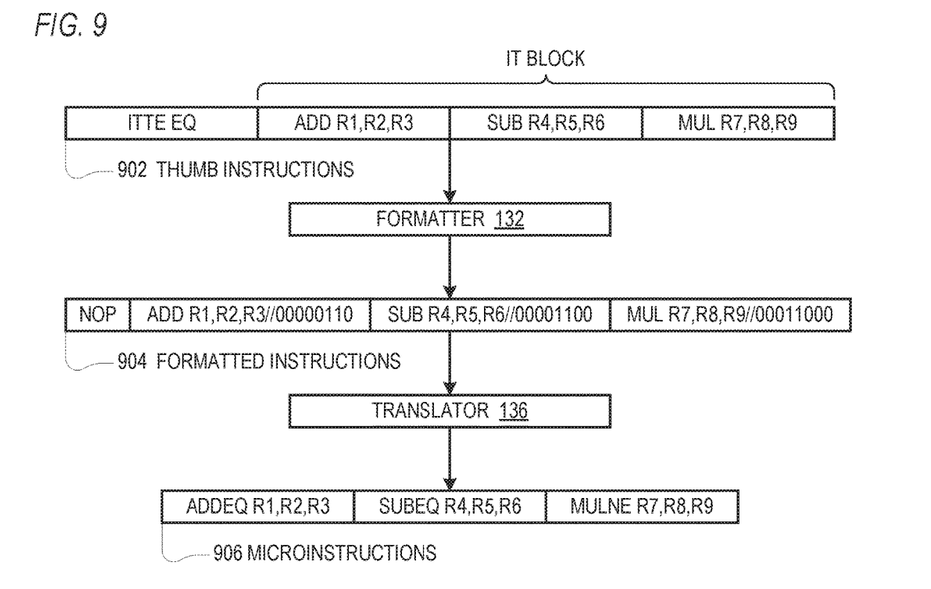
FIG. 9 is a block diagram illustrating an example of the operation of the microprocessor of FIG. 1 according to the flowchart of FIG. 8.

Referring now to FIG. 9, a block diagram illustrating an example of the operation of the microprocessor 100 of FIG. 1 according to the flowchart of FIG. 8 is shown. FIG. 9 includes a sequence of four Thumb instructions 902 received by the instruction formatter 132 that exemplify the sequence of N program instructions 152 received at block 802 of FIG. 8, where N is 4. The sequence of four instructions 902 includes an IT instruction (denoted ITTE EQ) that specifies an IT block size of three and whose conditions are EQ, EQ and NE, respectively, followed by a three instruction IT block. The IT block includes a Thumb unconditional add instruction (ADD R1, R2, R3) made conditional with a condition of EQ by the IT instruction, followed by a Thumb unconditional subtract instruction (SUB R4, R5, R6) made conditional with a condition of EQ by the IT instruction, followed by a Thumb unconditional multiply instruction (MUL R7, R8, R9) made conditional with a condition of NE by the IT instruction.

The instruction formatter 132 turns the sequence of four Thumb instructions 902 into a sequence of four formatted instructions 904 that is the IT instruction 152 turned into a no-op instruction (or alternatively simply flagged as a no-op instruction) followed by the three IT block instructions, and generates an ITSTATE 202 for the three IT block instructions that is 00000110, 00001100, and 00011000, respectively, as described above, particularly with respect to blocks 702 and 704 of FIG. 7, for provision to the instruction translator 136.

The instruction translator 136 translates the formatted instructions 904—including fusing the no-op instruction with an adjacent program instruction 152—into a sequence of three microinstructions 906 that exemplify the sequence of M microinstructions 154 generated at block 804 of FIG. 8, where M is 3, as described above, particularly with respect to blocks 708 and 712 of FIG. 7. The sequence of three microinstructions 906 includes a conditional add microinstruction with a condition of EQ (ADDEQ R1, R2, R3), followed by a conditional subtract microinstruction (SUBEQ R4, R5, R6) with a condition of EQ, followed by a conditional multiply microinstruction (MULNE R7, R8, R9) with a condition of NE.

Figure 10:
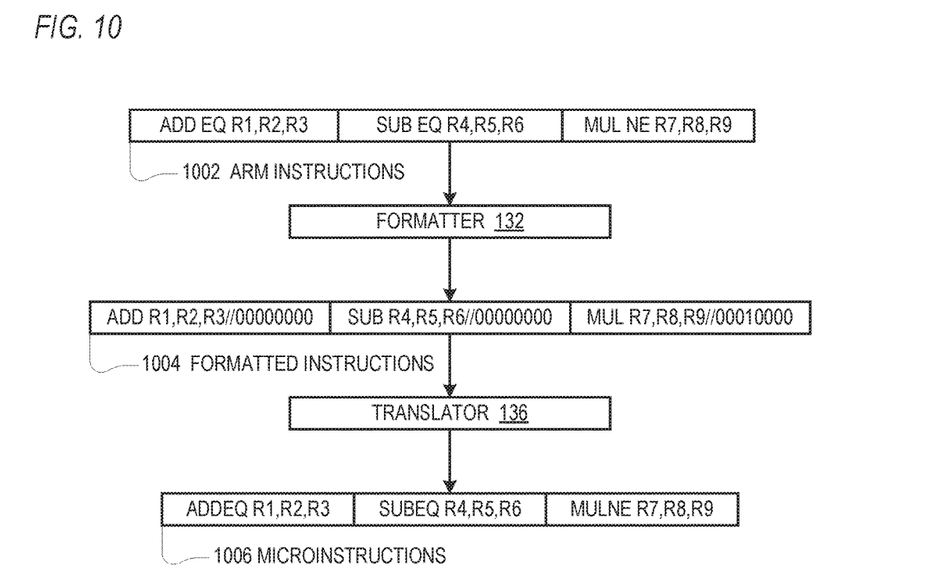
FIG. 10 is a block diagram illustrating an example of the operation of the microprocessor of FIG. 1 according to the flowchart of FIG. 8.

Referring now to FIG. 10, a block diagram illustrating an example of the operation of the microprocessor 100 of FIG. 1 according to the flowchart of FIG. 8 is shown. FIG. 10 includes a sequence of three ARM instructions 1002 received by the instruction formatter 132 that exemplify the sequence of N−1 program instructions 152 received at block 806 of FIG. 8, where N is 4. The sequence of three instructions 1002 includes an ARM conditional add instruction with a condition of EQ (ADD EQ R1, R2, R3), followed by an ARM conditional subtract instruction with a condition of EQ (SUB EQ R4, R5, R6), followed by an ARM conditional multiply instruction with a condition of NE (MUL NE R7, R8, R9).

The instruction formatter 132 turns the sequence of three ARM instructions 1002 into a sequence of three formatted instructions 1004 in which the first two (ADD R1,R2,R3 and SUB R4,R5,R6) have an ITSTATE 202 of 00000000 and the third (MUL R7,R8,R9) has an ITSTATE 202 of 00010000 for provision to the instruction translator 136.

The instruction translator 136 translates the formatted instructions 1004 into a sequence of three microinstructions 1006 that exemplify the sequence of M microinstructions 154 generated at block 808 of FIG. 8, where M is 3. The sequence of three microinstructions 1006 is the same as the sequence of three microinstructions 906 of FIG. 9.

As may be observed by contrasting FIGS. 9 and 10, advantageously, the fusing of the IT instructions by the microprocessor 100 provides the benefit of generating one fewer microinstruction 154 than would otherwise be generated, which has the advantage of consuming fewer resources in the microprocessor 100, such as ROB 124 entries, reservation station 114 entries, RAT 112 entries, IIR 122 entries, execution unit 116 allocation slots, instruction retire unit 118 slots and so forth.

Although embodiments have been described in which the IT instruction is an ARM ISA IT instruction, other embodiments are contemplated for fusing an IT instruction of other ISAs. Additionally, although embodiments have been described in which the instruction translator is capable of translating up to a specified number of instructions per clock cycle, other embodiments are contemplated in which the instruction translator is capable of translating up to a different number of instructions per clock cycle.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A method for performing, by a microprocessor, an If-Then (IT) instruction and an associated IT block, the method comprising:
    extracting condition information from the IT instruction;
    for each instruction of the IT block:
        determining a respective condition for the IT block instruction using the condition information extracted from the IT instruction;
        translating the IT block instruction into a microinstruction, wherein the microinstruction includes the respective condition; and
        conditionally executing the microinstruction based on the respective condition;
    wherein for a first instruction of the IT block, said translating the first IT block instruction into a microinstruction comprises fusing the IT instruction with the first IT block instruction, such that the fused instruction contains fewer microinstructions than the sum of the microinstructions of the IT instruction and the first IT block instruction, when not fused;
    wherein said extracting, said determining and said translating are performed by a hardware instruction translation unit of the microprocessor;
    wherein said conditionally executing the microinstructions is performed by execution units of the microprocessor;
    wherein the hardware instruction translation unit and the execution units are distinct hardware elements of the microprocessor and the execution units are coupled to the hardware instruction translation unit; and
    wherein the hardware translation unit performs said extracting, said fusing and for each instruction of the IT block said determining and said translating without writing intermediate results to a system memory.

2. The method of claim 1, wherein the IT instruction comprises a reduced instruction set computer (RISC) IT instruction.

3. The method of claim 1, the method further comprising:
for each instruction of the IT block, determining a respective state value using the extracted condition information, prior to said translating the IT block instruction into the microinstruction, wherein the state value comprises the lower eight bits of the IT instruction having the lower five bits left-shifted by N−1 bits, where N indicates a position of the IT block instruction in the IT block.

4. The method of claim 3, the method further comprising:
detecting that the microinstruction into which one of the instructions of the IT block was translated caused an exception condition in response to said conditionally executing the microinstruction; and
populating execution state bits for an IT instruction of a RISC Saved Processor Status Register (SPSR) associated with the exception with the respective state value of the one of the instructions of the IT block that was translated into the microinstruction that caused the exception condition, in response to said detecting.

5. The method of claim 3, wherein for each instruction of the IT block:
the respective condition within the microinstruction into which the IT block instruction is translated comprises bits [7:4] of the respective state value.

6. The method of claim 1, wherein the microinstruction into which the first instruction of the IT block and the IT instruction are fused performs only operations specified by the first instruction of the IT block and does not perform any operations for the IT instruction, wherein the IT instruction and IT block instructions are of a first instruction set that is architectural, wherein the microinstructions are of a second instruction set that is non-architectural.

7. The method of claim 1, further comprising:
wherein said conditionally executing the microinstructions produced by said translating each instruction of the IT block comprises issuing the microinstructions for execution out of program order.

8. A method for performing, by a microprocessor, an If-Then (IT) instruction and an associated IT block, the method comprising:
extracting condition information from the IT instruction;
for each instruction of the IT block:
determining a respective condition for the IT block instruction using the condition information extracted from the IT instruction;
translating the IT block instruction into a microinstruction, wherein the microinstruction includes the respective condition; and
conditionally executing the microinstruction based on the respective condition;
wherein for a first instruction of the IT block, said translating the first IT block instruction into a microinstruction comprises fusing the IT instruction with the first IT block instruction, such that the fused instruction contains fewer microinstructions than the sum of the microinstructions of the IT instruction and the first IT block instruction, when not fused;
wherein said extracting, said determining and said translating are performed by a hardware instruction translation unit of the microprocessor;
wherein said conditionally executing the microinstructions is performed by execution units of the microprocessor;
wherein the hardware instruction translation unit and the execution units are distinct hardware elements of the microprocessor and the execution units are coupled to the hardware instruction translation unit; and
wherein the hardware translation unit performs said extracting, said fusing, and for each instruction of the IT block said determining and said translating without execution of other architectural instructions by the microprocessor.

9. The method of claim 8, wherein the IT instruction comprises a reduced instruction set computer (RISC) IT instruction.

10. The method of claim 8, the method further comprising:
for each instruction of the IT block, determining a respective state value using the extracted condition information, prior to said translating the IT block instruction into the microinstruction, wherein the state value comprises the lower eight bits of the IT instruction having the lower five bits left-shifted by N−1 bits, where N indicates a position of the IT block instruction in the IT block.

11. The method of claim 10, the method further comprising:
detecting that the microinstruction into which one of the instructions of the IT block was translated caused an exception condition in response to said conditionally executing the microinstruction; and
populating execution state bits for an IT instruction of a RISC Saved Processor Status Register (SPSR) associated with the exception with the respective state value of the one of the instructions of the IT block that was translated into the microinstruction that caused the exception condition, in response to said detecting.

12. The method of claim 10, wherein for each instruction of the IT block:
the respective condition within the microinstruction into which the IT block instruction is translated comprises bits [7:4] of the respective state value.

13. The method of claim 8, wherein the microinstruction into which the first instruction of the IT block and the IT instruction are fused performs only operations specified by the first instruction of the IT block and does not perform any operations for the IT instruction, wherein the IT instruction and IT block instructions are of a first instruction set that is architectural, wherein the microinstructions are of a second instruction set that is non-architectural.

14. The method of claim 8, further comprising:
wherein said conditionally executing the microinstructions produced by said translating each instruction of the IT block comprises issuing the microinstructions for execution out of program order.

15. A method for performing, by a microprocessor, an If-Then (IT) instruction and an associated IT block, the method comprising:
extracting condition information from the IT instruction;
for each instruction of the IT block:
determining a respective condition for the IT block instruction using the condition information extracted from the IT instruction;
translating the IT block instruction into a microinstruction, wherein the microinstruction includes the respective condition; and
conditionally executing the microinstruction based on the respective condition;
wherein for a first instruction of the IT block, said translating the first IT block instruction into a microinstruction comprises fusing the IT instruction with the first IT block instruction, such that the fused instruction contains fewer microinstructions than the sum of the microinstructions of the IT instruction and the first IT block instruction, when not fused;

wherein said extracting, said determining and said translating are performed by a hardware instruction translation unit of the microprocessor;

wherein said conditionally executing the microinstructions is performed by execution units of the microprocessor;

wherein the hardware instruction translation unit and the execution units are distinct hardware elements of the microprocessor and the execution units are coupled to the hardware instruction translation unit; and wherein the hardware translation unit performs said extracting, said fusing and for each instruction of the IT block said determining and said translating in six clock cycles or less.

16. The method of claim 15, wherein the IT instruction comprises a reduced instruction set computer (RISC) IT instruction.

17. The method of claim 15, the method further comprising:

for each instruction of the IT block, determining a respective state value using the extracted condition information, prior to said translating the IT block instruction into the microinstruction, wherein the state value comprises the lower eight bits of the IT instruction having the lower five bits left-shifted by N−1 bits, where N indicates a position of the IT block instruction in the IT block.

18. The method of claim 17, the method further comprising:

detecting that the microinstruction into which one of the instructions of the IT block was translated caused an exception condition in response to said conditionally executing the microinstruction; and populating execution state bits for an IT instruction of a RISC Saved Processor Status Register (SPSR) associated with the exception with the respective state value of the one of the instructions of the IT block that was translated into the microinstruction that caused the exception condition, in response to said detecting.

19. The method of claim 17, wherein for each instruction of the IT block:

the respective condition within the microinstruction into which the IT block instruction is translated comprises bits [7:4] of the respective state value.

20. The method of claim 15, wherein the microinstruction into which the first instruction of the IT block and the IT instruction are fused performs only operations specified by the first instruction of the IT block and does not perform any operations for the IT instruction, wherein the IT instruction and IT block instructions are of a first instruction set that is architectural, wherein the microinstructions are of a second instruction set that is non-architectural.

* * * * *